June 20, 1950 S. A. KANE 2,511,854
METHOD AND APPARATUS FOR COOLING TURBOGENERATORS
AND REDUCING WINDAGE LOSSES
Filed Dec. 22, 1948 2 Sheets-Sheet 2

INVENTOR.
Saul Allan Kane
BY
Attorney

UNITED STATES PATENT OFFICE 2,511,854

METHOD AND APPARATUS FOR COOLING TURBOGENERATORS AND REDUCING WINDAGE LOSSES

Saul Allan Kane, Washington, D. C.

Application December 22, 1948, Serial No. 66,692

5 Claims. (Cl. 290—52)

(Granted under the act of March 3, 1883, as amended April 30, 1928; 370 O. G. 757)

The present invention relates to a method and apparatus for cooling and reducing windage losses in a turbo-generator and more particularly to a turbo-generator in which there has been eliminated the equipment normally required to cool the electric generator.

It is well known in the design of electrical generators that the size of the machine is determined not only by the desired capacity of output, but to a large extent by the temperature at which the machine will run. Thus a large capacity generator must either be artificially cooled, or else be big enough in size so that its heat will be radiated fast enough not only to protect its insulation from damage, but to also uphold its efficiency.

Heretofore, turbo-generator units have been very large and bulky in size and have had the disadvantage of requiring several auxiliary pieces of equipment to supply the artificial cooling for the generator. This auxiliary equipment usually consists of either fans for circulating air around the rotor and stator windings, or a liquid cooling system employing circulating pumps, cooling coils, and the like.

A further disadvantage of the old-style turbo-generator units is that usually the generator was separated a short distance away from the turbine and connected thereto by some form of coupling; all of which required considerable floor space for mounting the over-all unit. Furthermore, the generator was subjected to significantly high windage losses due to its operation at atmospheric pressure and its high revolutionary speeds, unless it had associated with it sizable auxiliary equipment for producing some partial vacuum within which the generator could operate.

The present invention is an improvement over prior devices in that all of the auxiliary units normally required for cooling are eliminated, and the turbine, generator, and condenser are all combined into a single compact machine. The rotor and stator of the generator are so mounted that there are channels between rotor, stator, and generator housing for the passage of exhaust steam to the condenser. The use of this low temperature, low pressure exhaust steam to maintain the generator at a safe operating temperature is a simple but effective improvement over old-type methods.

When the exhaust steam enters the confines of the condenser, which in the present device includes the generator, the temperature drops well below that at which the ordinary large capacity small size unit will operate, and this reduced temperature is sufficient to maintain the generator at a safe level, and uphold its over-all efficiency.

The use of temperature resistant insulation, such as silicone, or the like, in conjunction with an efficient method of cooling further enables the construction of large capacity units while maintaining the physical proportions of the machine much smaller than has been possible heretofore.

A still further improvement which is shown in the present invention is a considerable reduction in windage losses due to the fact that the entire electric generator is located within the partial vacuum of the condenser, there being a subatmospheric pressure within the condenser of the order of several inches of vacuum. The reduction of windage losses is a significant problem in large machines operating at the high speeds common to turbo-generators.

The efficiency of this method of cooling is also much higher in the present than in the old device. For example, if the present machine runs at less than full load less steam is admitted to the turbine, and since the condenser always operates at the same level, its temperature will be lower because it has less steam to condense, and as the generator is within the condenser its temperature will be lower. On the other hand, in prior known machines which employ auxiliary fans or pumps for cooling, regardless of whether the input steam is reduced or not, the cooling devices operate at full level whereby the over-all cooling efficiency is substantially lower than that of the present invention for the same amount of power output.

An object of the present invention is the provision of a method and apparatus for cooling a turbo-generator.

Another object is to provide a method and apparatus whereby a turbo-generator is cooled by means of exhaust steam from the turbine.

A further object is to provide a method and apparatus for reducing windage losses in a turbo-generator.

A still further object is the provision of means whereby large capacity turbo-generators may be constructed with small physical dimensions.

Yet another object of the invention is the provision of a turbo-generator in which the generator is within the confines of the condenser.

Other objects and features of the invention will become apparent to those skilled in the art as the disclosure is made in the following detailed description of a preferred embodiment of the invention as illustrated in the accompanying drawings in which.

Figure 1:
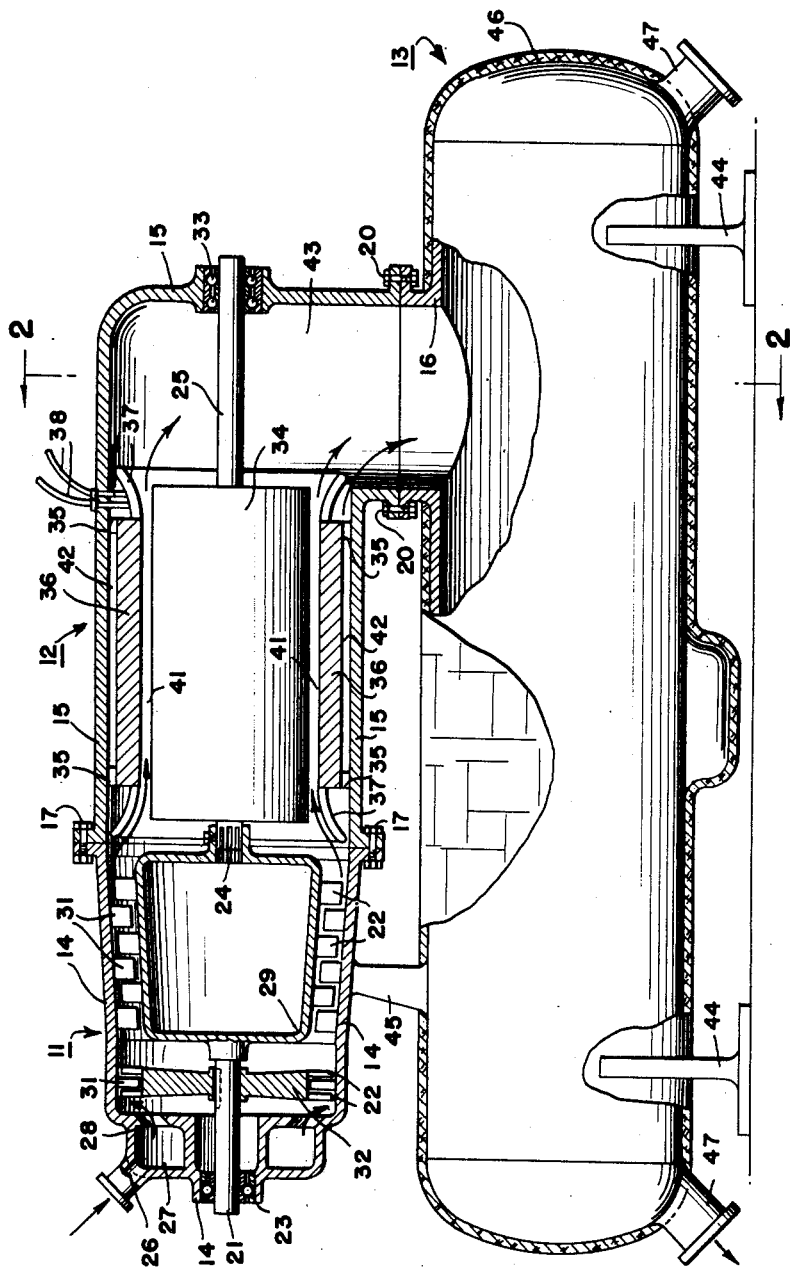
Fig. 1 is a front elevation of the preferred embodiment of the invention.
Figure 2:
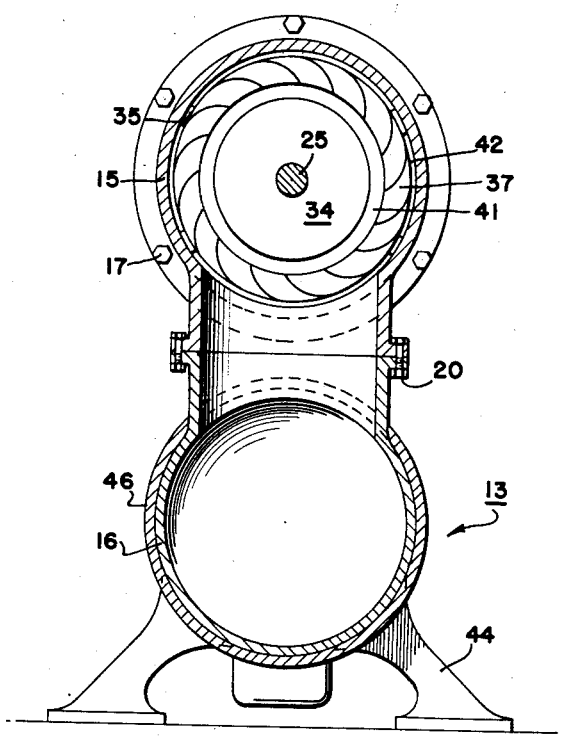
Fig. 2 is a sectional view taken along the line 2—2 of Fig. 1 and looking in the direction of the arrows.

Referring now to the drawings, wherein like reference characters designate like or corresponding parts, throughout the several views, there is shown in Fig. 1 a turbine, a generator, and a condenser, generally indicated as 11, 12, and 13 respectively, the housing 15 of the generator 12 being attached at one end to the housing 14 of the turbine 11 by means of bolts 17, and at its other end to the housing 16 of the condenser 13 by means of bolts 20 thereby forming an integral unit of the three machines.

The turbine 11 has a shaft 21, to which is attached first stage wheel 32 and frame 29, on each of which are mounted rotor blades 22; the shaft 21 riding at one end on bearings 23 set into the housing 14, and terminating at its other end in a coupling 24 which joins turbine shaft 21 and generator shaft 25. There is an input port 26 for the admittance of a condensable, elastic fluid such as steam, the port 26 connecting with an annular chamber 27 wherein is carried a ring of nozzles 28 for directing the elastic fluid against the blades 22. Cooperating with rotor blades 22 is a series of stator blades 31 whereby the elastic fluid which is admitted under pressure by port 26 causes shaft 21 to rotate, the elastic fluid meanwhile expanding as it successively passes from one set of blades to another. In the present instance the first stage wheel 32 is shown as carrying two rows of blades 22 with a row of intermediate blades 31 between them, and the other stages are shown each with a single row of blades. It will be understood, however, that this is by way of example only, and any other suitable arrangement of blades will function just as satisfactorily.

The generator, shown generally as 12, has its shaft 25 carried at one end by bearings 33, set into housing 15, and its other end integrally connected to shaft 21 by means of coupling 24; the shaft 25 having rigidly attached thereto the generator rotor 34 from which the windings have been omitted for clarity. Connected to the generator housing 15 by means of spiders 35 is the generator stator 36, surrounding which is the stator winding 37 having output leads 38. As can be clearly seen in the drawings the rotor 34 and the stator 36 are spaced apart a slight distance to form an axial channel 41 running the entire length of the generator, and also that the spiders 35 form an additional channel 42 between the stator 36 and the housing 15, whereby the elastic fluid, when it leaves the turbine, exhausts through the channels 41 and 42 into the chamber 43 and thence to the condenser 13.

The chamber 43 is relatively large and functions with channels 41 and 42 to provide for a free flow of exhaust gases, feeding directly into the condenser 13 which may be of any conventional type. The entire device rests upon the supports 44, while the brace 45 between the turbine and the condenser, aids in making the device an integral machine. The condenser 13 is coated with a layer of cork 46 or similar material to reduce condensation on the outside surface of the condenser in as much as the temperature within the condenser is below the ambient temperature of the room where the machine is located, the ports 47 being used for the passage of water which circulates through cooling tubes (not shown) in the condenser.

In the operation of the present invention, some condensable elastic fluid as steam, is inserted under pressure through the input port 16, from whence it goes into the annular chamber 27 and then through the nozzles 28 to turn the rotor blades 22. When the elastic fluid enters the turbine 11 it is at high pressure and high temperature but it expands in passing from one set of rotor blades to another, until it reaches the end of the turbine, at which point it has changed to low pressure low temperature. It is to be noted that shaft 21 is closely coupled to shaft 25 by the coupling 24 with the result that the low pressure low temperature expanded fluid enters the generator 12 immediately on leaving the turbine 11. The channels 41 and 42 extending axially along the rotor 34 and stator 36 of the generator offer a free path for the flow of the cool elastic fluid whereby it enters the chamber 43 and finally the condenser 13. Thus the desired cooling effect for the generator is obtained by the passage, through the generator, of the low temperature low pressure exhaust steam from the turbine.

Attention is also called to the fact that the rotor 34, stator 36 and chamber 43 are all effectively within the scope and influence of the partial vacuum of the condenser 13. The operation of a revolving machine within the confines of reduced atmospheric pressure significantly minimizes the windage losses in the machine and thereby increases its over-all efficiency.

Therefore, from the above description of the drawings and operation it is clear that the present invention not only sets forth a novel method and apparatus for the cooling of a turbogenerator by utilizing the exhaust steam from the turbine rather than employing auxiliary equipment, but it also shows a single compact device in which the generator element is within the confines of the condenser itself thereby materially reducing windage losses.

It should be understood, of course, that the foregoing disclosure relates to only a preferred embodiment of the invention and that numerous modifications or alterations may be made therein without departing from the spirit and the scope of the invention as set forth in the appended claims.

The invention described herein may be manufactured and used by or for the Government of the United States of America for governmental purposes without the payment of any royalties thereon or therefor.

What is claimed is:

1. The method of reducing windage losses in a turbo-generator comprising the steps of admitting a condensable elastic fluid under high pressure into the turbine whereby the fluid expands, exhausting the expanded fluid through channels in the generator and into a condenser to form a partial vacuum within the condenser, and mounting the generator within the confines of the condenser and partial vacuum thereby to reduce windage losses.

2. In a unit consisting of a turbine, generator, and condenser wherein the generator is mounted within the confines of the condenser, the method of cooling the generator comprising the steps of admitting a condensable elastic fluid under high pressure into the turbine whereby the fluid expands, and withdrawing the expanded fluid from the turbine through channels around the rotor and between the stator and housing of the generator and into the condenser so that the temperature of the generator falls below the ambient temperature surrounding the unit.

3. In a propulsion device comprising a turbine, an electrical generator, and input port for admitting a condensable elastic fluid under pressure, a turbine rotor through which the fluid expands, a condenser for receiving the fully expanded fluid, a generator rotor within said condenser integral with the turbine rotor and in close proximity thereto and means for exhausting the expanded fluid through the aforementioned generator.

4. In a propulsion device comprising a turbine and an electrical generator, an input port for admitting a condensable elastic fluid under pressure, a turbine rotor through which the fluid expands, a condenser for receiving fully expanded fluid to create a partial vacuum therein, the electrical generator having rotor and stator members within the confines of said condenser, the generator rotor member being integral with the turbine rotor and in close proximity thereto, the said generator rotor member being spaced apart from the stator member to form a channel there between, the stator member also being spaced apart from the generator housing to form a channel there between, the said channels forming an exhaust path for the expanded fluid into the condenser whereby the generator is cooled below the ambient temperature of the device when the expanded fluid passes through the channels.

5. Apparatus for cooling and reducing windage losses in a propulsion device comprising a turbine, an electrical generator and a condenser, the generator housing being integral with the condenser housing and forming a portion thereof, there being a partial vacuum within the confines of the condenser and generator, an input port for admitting a condensable elastic fluid under pressure, a turbine rotor through which the fluid expands, the generator having rotor and stator members, the generator rotor member being integral with the turbine rotor and in close proximity thereto, the said generator rotor member being spaced apart from the stator member to form a channel therebetween, the stator member also being spaced apart from the generator housing to form a channel there between, the said channels forming an exhaust path to the condenser for the expanded fluid whereby the expanded fluid cools the generator when it passes through the channels and the partial vacuum reduces windage losses.

SAUL ALLAN KANE.

REFERENCES CITED

The following references are of record in the file of this patent:

UNITED STATES PATENTS

| Number | Name | Date |
|---|---|---|
| 270,518 | Vander Weyde | Jan. 9, 1883 |
| 1,502,065 | Smith | July 22, 1924 |
| 1,528,754 | Bresson | Mar. 10, 1925 |
| 1,708,402 | Schilling | Apr. 9, 1929 |
| 1,741,605 | Baumann | Dec. 31, 1929 |
| 1,820,725 | Bailey | Aug. 25, 1931 |
| 2,180,168 | Puffer | Nov. 14, 1939 |
| 2,266,355 | Chun | Dec. 16, 1941 |
| 2,358,301 | Brauns | Sept. 19, 1944 |
| 2,436,683 | Wood, Jr. | Feb. 24, 1948 |
| 2,444,415 | Beeson | July 6, 1948 |
| 2,452,581 | Lehmann | Nov. 2, 1948 |

FOREIGN PATENTS

| Number | Country | Date |
|---|---|---|
| 339,211 | Great Britain | Dec. 4, 1930 |
| 361,305 | Great Britain | May 14, 1930 |